UNITED STATES PATENT OFFICE.

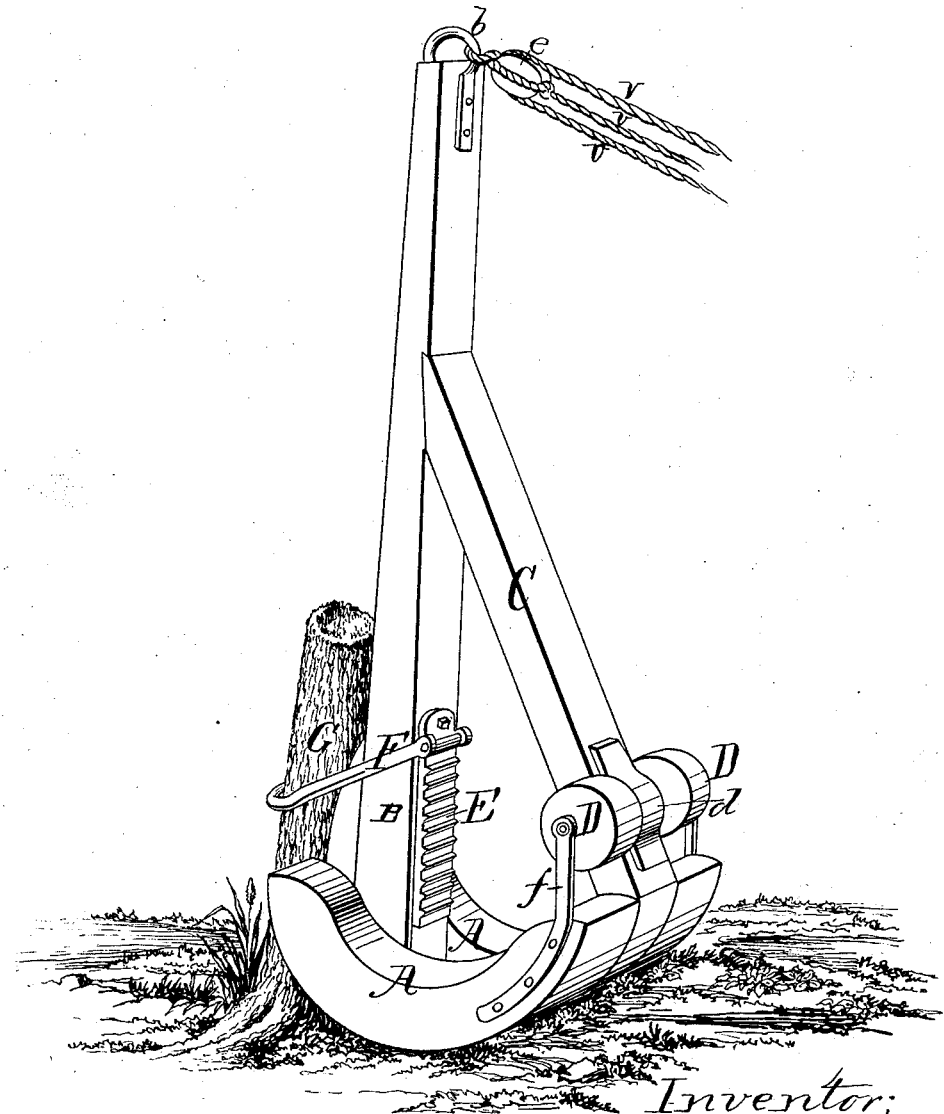

J. H. FLANAGAN, OF CHICAGO, ILLINOIS, AND WILLIAM LANING, OF STOUGHTON, WISCONSIN.

IMPROVEMENT IN GRUBBING-MACHINES.

Specification forming part of Letters Patent No. 41,287, dated January 19, 1864.

*To all whom it may concern:*

Be it known that we, JEREMIAH H. FLANAGAN, of Chicago, in the county of Cook and State of Illinois, and WILLIAM LANING, of Stoughton, in the county of Dane and State of Wisconsin, have invented a certain new and useful Improvement in Grubbing-Machines; and we do hereby declare that the following is a full, clear, and exact description thereof, reference being had to the accompanying drawing, and the letters and figures marked thereon, which forms part of this specification.

In the said drawing, which is hereunto annexed, the figure represents a perspective view of our invention attached to a stump ready for operation.

The object of our invention is to obtain a strong and durable machine for pulling up small stumps and roots from the ground to prepare the ground for cultivation, which shall at the same time be very simple and easy of construction, and cheap enough to bring it within the means of all who have need of such a machine, and which is much more effective and easily operated and less liable to get out of repair than other machines now in use for the same purpose.

To enable others skilled in the art to understand how to construct and use our invention, we will proceed to describe the same with particularity, reference being made to the annexed drawings.

A A in the said drawings represent two circular rockers or shifting fulcrums, whose rocking or adjustable surfaces are in form substantially the arcs of circles. These shifting or rocking fulcrums are constructed of suitable timbers, and of a size proportionate to the work to be effected thereby.

B represents a long upright lever firmly attached at one end of the said rocking fulcrum A A, as shown; and C represents an arm or brace firmly attached to the other end of said fulcrum, and extending nearly to the upper end of the lever B, to which it is then firmly attached.

D D represent two rollers or wheels supported in bearings in the arms $f\,f$ and the strap $d$, fixed upon the brace C.

E represents a strip or piece of metal attached to the lever B, provided with horizontal grooves, as is clearly shown in the drawings; and F is a clevis or clasp whereby the stump or root to be pulled up and removed is attached or fastened to the machine. The stump is marked G in the drawing.

$a$ represents a wedge-shaped or triangular bite or jaw, against which the stump rests, and by which it is prevented from sliding through the clasp F when being operated upon by the machine, as hereinafter described.

$b$ represents a staple or clasp attached to the upper end of the lever B to facilitate the attachment of the power thereto.

$c$ represents a pin passing through the ends of the clasp F, and resting in one of the aforesaid grooves in E, as shown, for the purpose of confining said clasp to the lever B.

$e$ represents a pulley or block, and $r\ r$ cords passing around the same, whereby the power is applied to extract the stump or root G.

$f$ represents two arms fastened to the fulcrums A A, projecting up therefrom, as shown, to serve as supports for the axle of the rollers D D.

Having thus described the construction of our invention, we will now describe its operation.

The machine is backed up and adjusted near the stump as shown in the drawing, and the clasp F adjusted about the stump, as shown. The object of the grooved plate E is to enable the same clasp F to be adjusted to stumps or roots of different sizes, so that stumps of different sizes may be extracted by the machine with equal facility and ease. To adjust the machine to the largest size of which it is capable, the pin $c$, passing through the ends of the clasp, is adjusted in the lowest groove in the plate E; and to adjust it to the smallest dimension of which it is capable the pin $c$ is adjusted in the highest or upper groove in said plate, and for intermediate sizes the said pin $c$ is adjusted in the intermediate grooves therein. The machine having thus been adjusted and the stump fastened thereto, as shown and described, the power is applied by means of the pulley $e$, the cords $r\ r$, and another pulley, around which the said cords pass, attached to a stump or other proper attachment at a convenient distance from the machine, so that a span of horses may be attached to one end of the rope extending from said last-named pulley and move off in a right line. The effect of this is to bring the end of the lever B down toward the ground, and, being rigidly attached to the fulcrum A A, the said fulcrum rocks over in the same direction, so that the point of contact with the ground gradually changes and moves along toward the rollers D D, and the end to which the lever B is attached as gradually rises, thereby gradually elevating the lever B and the stump G, which is rigidly fixed thereto, and thus the stump is extracted.

As the end of the lever B is brought down so that the lever lies parallel to the ground and the stump is entirely extracted, the fulcrum shifts from A A, and the whole weight of the machine, with the stump superadded, rests upon the rollers or wheels D D, when the pulley $e$, which should be attached to the link $b$ by a hook, can be readily detached and the team attached directly to the said lever, and the stump drawn off to any place desired upon the truck thus formed.

Having now described the construction and operation of our improved grubbing-machine, we will specify what we claim as new therein, and desire to secure by Letters Patent—

1. The employment of the grooved plate E in combination with the clevis F and pin $c$, for the purpose of adjusting the machine to stumps of different sizes, substantially as herein described and shown.

2. The combination and arrangement of the circular fulcrum A A, the lever B, clevis F, and grooved plate E, constructed and operating as and for the purposes herein shown and specified.

J. H. FLANAGAN.
WM. LANING.

Witnesses:
W. E. MAUS,
R. EMERY,
M. JOHNSON.